(12) United States Patent
Morishita (10) Patent No.: US 7,520,655 B2
(45) Date of Patent: Apr. 21, 2009

(54) LIQUID CRYSTAL DISPLAY MODULE

(75) Inventor: Shizuo Morishita, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 175 days.

(21) Appl. No.: 11/526,571

(22) Filed: Sep. 26, 2006

(65) Prior Publication Data

US 2007/0070646 A1    Mar. 29, 2007

(30) Foreign Application Priority Data

Sep. 28, 2005    (JP)    ............... 2005-282719

(51) Int. Cl.
G02F 1/1335 (2006.01)
G02F 1/1333 (2006.01)
F21V 7/04 (2006.01)

(52) U.S. Cl. ............... 362/632; 362/633; 362/634; 349/58

(58) Field of Classification Search ............... 362/613, 362/633, 632, 634; 349/58
See application file for complete search history.

(56) References Cited

U.S. PATENT DOCUMENTS

| 5,729,310 | A  | * | 3/1998 | Horiuchi et al. ............... 349/62 |
| 6,715,896 | B2 | * | 4/2004 | Kawashima et al. ........ 362/613 |
| 6,979,114 | B2 | * | 12/2005 | Kao ........................... 362/633 |
| 2002/0114152 | A1 | * | 8/2002 | Fujino et al. .................. 362/31 |
| 2004/0207996 | A1 |   | 10/2004 | Kao |
| 2005/0180168 | A1 |   | 8/2005 | Chun et al. |
| 2006/0243948 | A1 | * | 11/2006 | Ishiwa et al. ........... 252/299.61 |

FOREIGN PATENT DOCUMENTS

CN        1661446        8/2005

* cited by examiner

*Primary Examiner*—Sandra O'Shea
*Assistant Examiner*—James W Cranson
(74) *Attorney, Agent, or Firm*—Young & Thompson (57) ABSTRACT

A housing member accommodates a liquid crystal display panel and a lighting unit. The housing member is provided with a penetrated space for receiving a light-source unit in the lighting unit therein. A pair of fastening members are attached to a pair of openings of the space, respectively, for supporting the light-source unit within the space such that each of the fastening members allows to insert the light-source unit into the space from either one of the pair of openings.

15 Claims, 13 Drawing Sheets

LIQUID CRYSTAL DISPLAY MODULE

BACKGROUND OF THE INVENTION

1. Field of the Invention

The present invention relates to a liquid crystal display module, and particularly to a liquid crystal display module provided with a removable lamp unit structure.

2. Description of the Related Art

As thin display devices with low power consumption, liquid crystal display (LCD) devices have been widely used for display monitors, displays for personal computer, and displays for portable devices such as cellular phones and personal digital assistants (PDAs). LCD devices are generally provided in a module configuration in which an LCD panel, a back light unit and the like are integrated, and these LCD devices are incorporated into set products by set makers.

A structure of such an LCD module is briefly described. An LCD module is configured by housing an LCD panel and a back light unit together. The back light unit includes a fluorescent lamp, a lamp holder which holds the fluorescent lamp, and which has a function as a light reflector plate for reflecting light from the fluorescent lamp. A housing case of the LCD module is provided with an opening such that the lamp holder of the lamp unit is structured so as to be plugged into the LCD module through the opening. By plugging the lamp holder into the opening, the light guide plate, which is placed in a space surrounded by the housing case, and the fluorescent lamp of the lamp unit are aligned. By turning on the fluorescent lamp, light therefrom is directed to the light guide plate so that light of the back light is supplied from the light guide plate to the LCD panel. Moreover, the lamp unit is mounted on the LCD module so that the lamp unit is detachable from the LCD module. Thereby, in a case where the fluorescent lamp is replaced by new one due to life-time or a defect, each unit can be exchanged easily.

Incidentally, consideration will be made for a case where the LCD module as described above is incorporated into a set product such as a laptop computer or an LCD monitor. A connector of the lamp unit, which is provided to a lamp cable, is connected to a connecting terminal on the set product. Thereby, a drive voltage is supplied from the set product. Accordingly, the fluorescent lamp of the lamp unit is turned on.

Due to convenience in designing of the set product, there are cases where the connecting terminal of the set product for supplying the drive voltage is placed at the side not near but far from an output port for the lamp cable of the LCD module. In such cases, to connect the connector of the lamp unit to the connecting terminal on the set product, it is necessary to extend one of the lamp cable, and an inverter cable, of the lamp unit so that the cable is long enough to reach the connecting terminal of the set product and to be connected to the connecting terminal on the set product. In a case where extension of the lamp cable or the inverter cable is not desired, in order to connect the connector of the lamp unit to the connecting terminal of the set product, it is considered that the LCD module is rotated 180 degrees to be placed and connected to the connecting terminal of the set product.

However, the extension of the lamp cable as well as the rotation and placement of the LCD module may change characteristics, such as display characteristics or electric characteristics, of the LCD module. For example, when the lamp cable is extended, electric leak from the lamp cable is increased, and luminance of the lamp may decrease. Furthermore, when the LCD module is placed by rotating thereof, display characteristics, such as view angle characteristic, gradation characteristics, color, in-plane luminance distribution and the like, are changed. For this reason, desirable display characteristics may not be obtained.

SUMMARY OF THE INVENTION

Accordingly, an exemplary feature of the present invention is to provide an LCD module in which a new structural design is not needed, and which has a large degree of freedom for being adapted with set products.

The liquid crystal display module of the present invention including a liquid crystal display panel, a lighting unit for illuminating the liquid crystal display panel, the lighting unit including a light-guiding member and a light-source unit, a housing member for accommodating the liquid crystal display panel and the lighting unit, the housing member being provided with a penetrated space for receiving the light-source unit therein, and a pair of fastening members attached to a pair of openings of the space, respectively, for supporting the light-source unit within the space such that each of the fastening members allows to insert the light-source unit into the space from either one of the pair of the openings.

It is preferable that the light-source unit includes a light-source holding member for reflecting light from a light source towards the light-guiding member, and both ends of the light-source holding member are clamped by the fastening members.

It is preferable that the light-guiding member is a light guide plate located behind the liquid crystal display panel such that the light-source holding member is arranged to be optically coupled to a side edge surface of the light guide plate.

It is preferable that the pair of openings are arranged such that light-source holding member is allowed to be inserted through one of the openings while being guided along the side of the light guide plate.

It is preferable that each of the fastening members is a plate spring provided in the vicinities of the pair of openings.

It is preferable that the plate spring has an L-shaped plate such that an end portion thereof is allowed to displace its position to allow passing the light-source holding member through the pair of openings.

It is preferable that each of the fastening members is made of a mechanical coupling structure using concave and convex portions provided inside of the space and outside of the light-source unit in the vicinities of the pair of openings.

It is preferable that the pair of openings are disposed in a way that the two openings are respectively on the two opposite sides of the light-guiding member in a direction of a longer side thereof.

It is preferable that a plurality of pairs of openings are disposed in a way that each of the pairs has the two openings respectively on two opposite sides of the light-guiding member.

It is preferable that the pair of openings are disposed in a way that the two openings are respectively on the two opposite sides of the light-guiding member in a direction of a shorter side thereof.

It is preferable that the light-guiding member is a light guide plate, a side of the light guide plate is disposed such that the side thereof is exposed in a space surrounded by the pair of openings of the housing member, and a lamp holder of the light-source unit is inserted in the housing member through one of the openings while being guided along the side of the light guide plate.

It is preferable that the pair of openings are disposed in a way that the two openings are respectively on the two opposite sides of the light guide plate in a direction of a longer side thereof.

It is preferable that a plurality of pairs of openings are disposed in a way that each of the pairs has two openings respectively on the two opposite sides of the light guide plate.

It is preferable that the pair of openings are disposed in a way that the two openings are respectively on the two opposite sides of the light guide plate in a direction of a shorter side thereof.

It is preferable that the lighting unit is one of a back light unit and a front light unit which receives light from the light source, and which illuminates the liquid crystal display panel.

With the liquid crystal display module according to the present invention, the light source of the lighting unit can be inserted into the frame through any one of the pair of openings, the two openings being respectively provided to the two opposite side surfaces of the frame. Furthermore, when inserting the light source of the lighting unit into the frame formed with a front chassis and a back chassis, the light source of the lighting unit is held in the frame with the fastening means. Thus, the following exemplary advantage is brought about.

According to the present invention, it is made possible to connect the connector of the light-source unit to the connecting terminal of the set product, and to supply the drive voltage to the light-source unit of the lighting unit without the need of the following. Specifically, there is no need to extend the lamp cable and the like to connect thereof to a connecting terminal on the set product, or to rotate, instead of to extend, the liquid crystal display module by 180 degrees to connect the lamp cable to the connecting terminal on the set product.

Consequently, it is rarely necessary to have a new structural design for accommodating the disposition of the connecting terminal of the set product. Thereby, the liquid crystal display module, which has a large degree of freedom for being adapted to the set products, can be achieved.

BRIEF DESCRIPTION OF THE DRAWINGS

These and other objects and advantages and further description of the invention will be more apparent to those skilled in the art by reference to the description, taken in connection with the accompanying drawings, in which.

DETAILED DESCRIPTION OF THE PREFERRED EMBODIMENTS

First Embodiment

Referring FIG. 1 to FIG. 4, an LCD module of a first exemplary embodiment includes a lamp unit 1 (FIG. 3A) mounted therein as an example of a light-source unit. The lamp unit 1 has a lamp holder 2 provided with lamp cables 5 with a connector 4. The lamp holder 2 has a cold-cathode fluorescent lamp as an example of a lamp 3 (FIG. 4C), and reflects light from the lamp. The connector 4 is for external connection, and supplies a drive voltage to the lamp. The lamp cables 5 electrically connect the lamp holder and the connector 4. As shown in FIG. 3A, a light guide plate 16 is sandwiched between a front chassis 13 and a back chassis 18 to provide a lighting unit. The LCD module 10 includes an LCD panel 12 and the lighting unit.

Figure 1A:
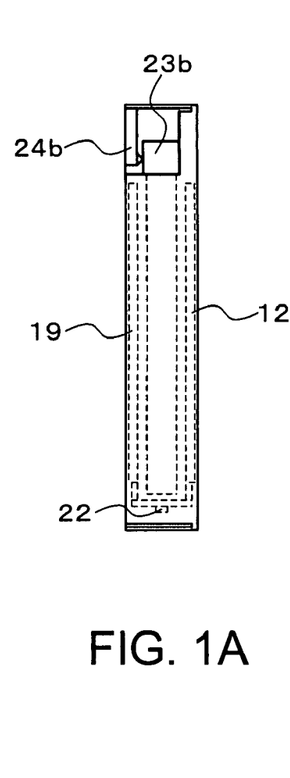
FIG. 1A is a view showing the left side of an LCD module of a first exemplary embodiment of the present invention.
Figure 1B:
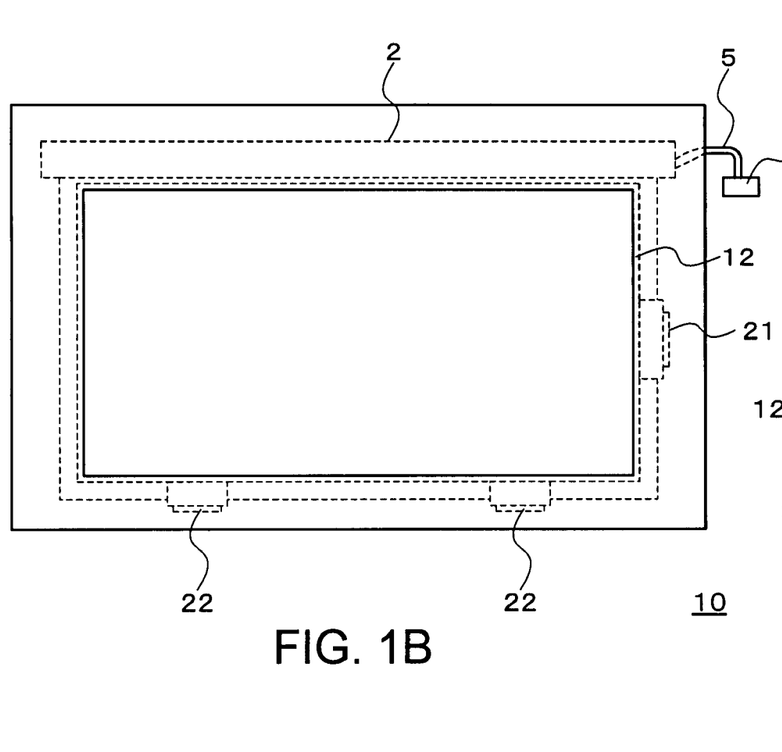
FIG. 1B is a plan view of the LCD module.
Figure 1C:
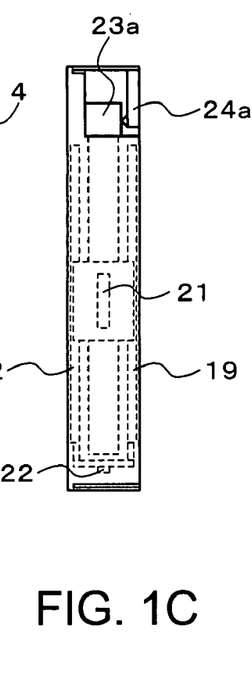
FIG. 1C is a view showing the right side of the LCD module.

Moreover, as shown in FIGS. 1A and 1C, the LCD module 10 includes a pair of insertion openings 23a and 23b, the two openings being respectively on two opposite side surfaces of a housing member. Fastening means is provided in each of the vicinities of the pair of openings 23a and 23b in order to hold the lamp holder 2 in the frame when the lamp holder 2 is inserted through one of the insertion openings 23a and 23b.

In the embodiment, the above-described lighting unit is a so called back light unit, which receives light from the cold-cathode fluorescent lamp of the above lamp unit 1, and illuminates the above LCD panel 12. The lighting unit includes a light guide plate 16 to illuminate the LCD panel 12 by light from the lamp unit 1, and the lamp unit 1.

Figure 2:
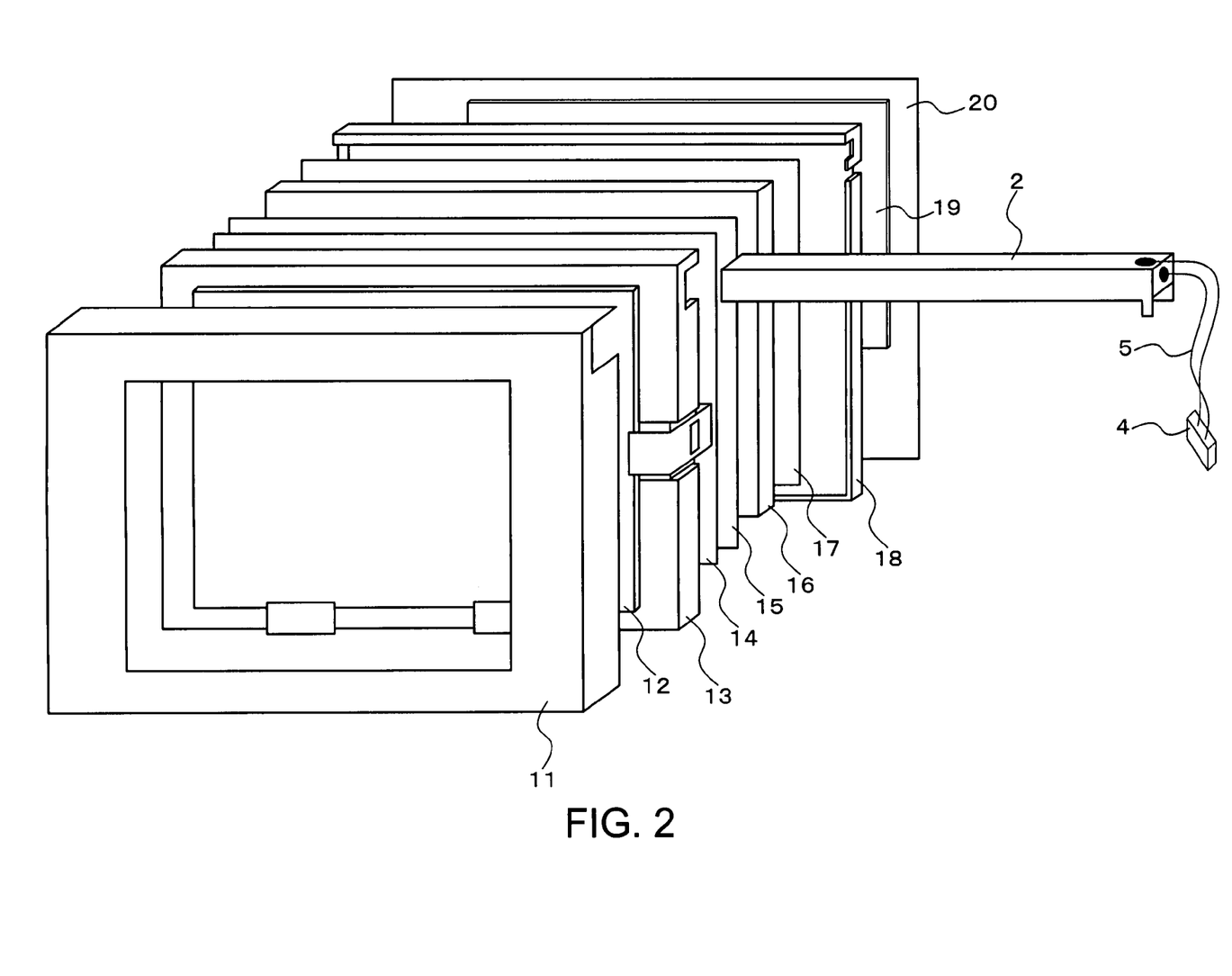
FIG. 2 is an exploded perspective view of the LCD module of the first exemplary embodiment.

More precise, as shown in FIG. 2, the LCD module 10 of the present embodiment includes a front shied 11, the LCD panel 12, the front chassis 13, a light condenser sheet 14, a diffuser sheet 15, a light guide plate 16, a reflector sheet 17, the back chassis 18, a signal processing substrate 19, and a back shield 20. The front chassis 13 and the back chassis 18 are fastened to each other in a state where the front chassis 13 and the back chassis 18 hold the light guide plate 16 therebetween. The reflector sheet 17 is disposed between the light guide plate 16 and the back chassis 18. The diffuser sheet 15 is disposed between the light guide plate 16 and the front chassis 13, and adequately diffuses light as back light emitted by the light guide plate 16. The light condenser sheet 14 is disposed between the front chassis 13 and the diffuser sheet 15, and properly condenses and emits light emitted from the diffuser sheet 15. The LCD panel 12 of a transparent or a semi-transparent type is disposed on the front chassis 13. The front shield 11 covers the LCD panel 12.

Specifically, the front chassis 13 and the back chassis 18 are fastened to each other in a state where the chassis 13 and 18 hold therebetween the light condenser sheet 14, the diffuser sheet 15, the light guide plate 16, and the reflector sheet 17 which are superposed. As shown in FIGS. 1B and 1C, the LCD panel 12, vertical driver ICs 21 and horizontal driver ICs 22 are connected with one another to form a structure in the following manner. The LCD panel 12 and the vertical driver ICs 21 are electrically connected to one another; the LCD panel 12 and the horizontal driver ICs 22 are electrically connected to one another; the vertical driver ICs 21 and a signal processing substrate 19 are electrically connected to one another; and the horizontal driver ICs 22 and the signal processing substrate 19 are electrically connected to one another. In general, the vertical driver ICs 21 and the horizontal driver ICs 22 are mounted on a flexible carrier tape in the form of a tape carrier package (TCP), and are connected via a flexible print substrate (FPB). The structure, which is formed by connecting the LCD panel 12, the respective driver ICs 21 and 22 and the signal processing substrate 19, is bent on a portion of a flexible member such as the carrier tape or the flexible print substrate. Thereby, the LCD panel 12 is superposed, and is disposed on the front surface of the chassis 13, and the signal processing substrate 19 is superposed, and is disposed on the back of the back chassis 18. Furthermore, the front shield 11 is attached to the front surface of the front chassis 13. The back shield 20 is attached to the back surface of the back chassis 18.

In the embodiment, the pair of insertion openings 23a and 23b for plugging in the lamp holder 2 of the lamp unit 1 are formed on the frame portion formed by the front chassis 13 and the back chassis 18. As shown in FIG. 1C, the insertion opening 23a is provided to the right side of the frame, and the insertion opening 23b is provided to the left side of the frame. That is, the insertion openings 23a and 23b are respectively provided to the right and left sides of the frame. As an example of fastening means which holds the lamp holder 2 in the frame, locking parts 24a and 24b in the form of substantially L-shaped plate spring are respectively disposed on the back chassis 18 in the vicinities of entrances of the insertion openings 23a and 23b.

Figure 3A:
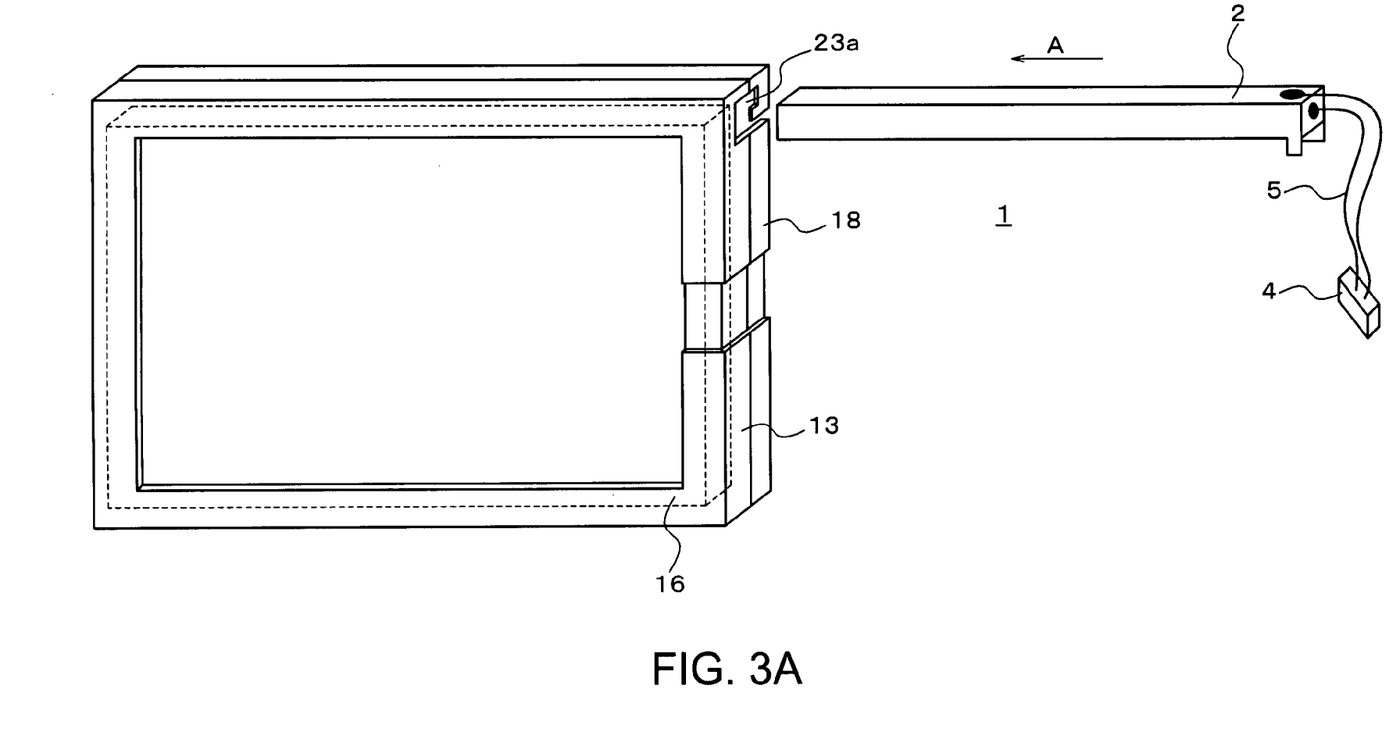
FIG. 3A is a perspective view for describing the mounting of a lamp unit on the LCD module of the first exemplary embodiment.
Figure 3B:
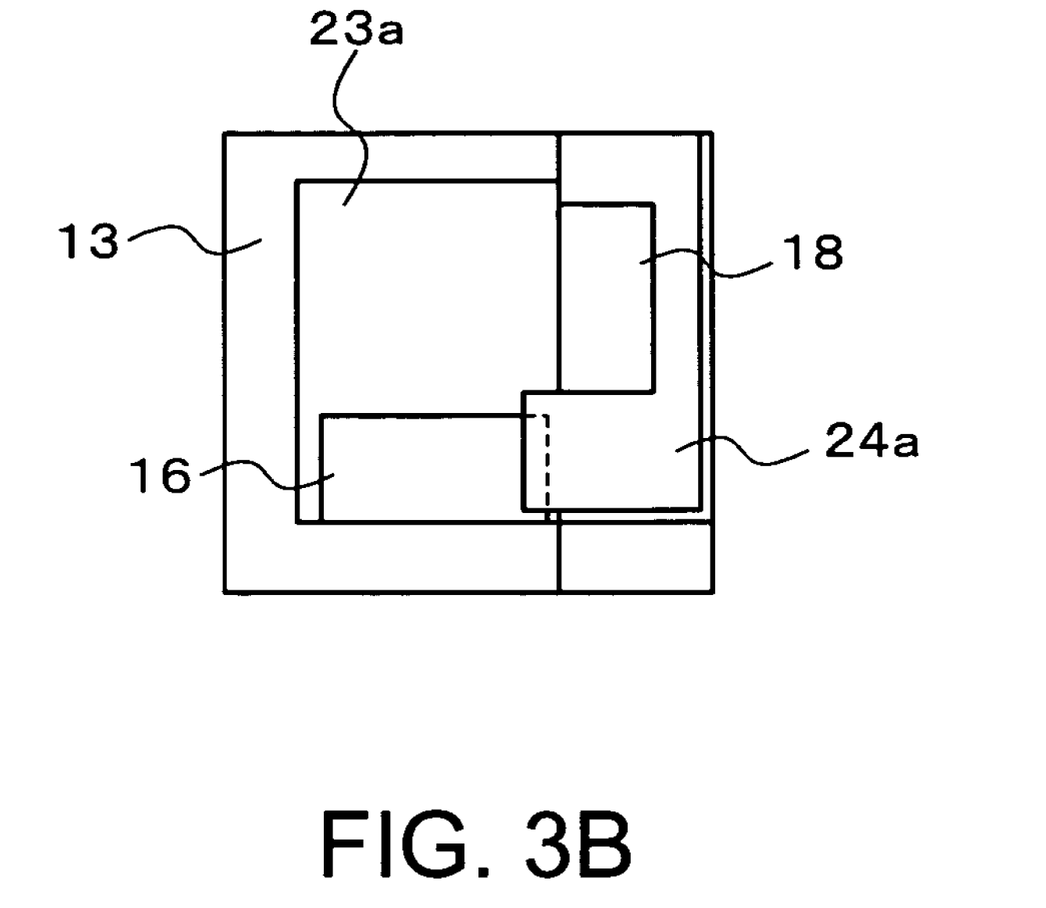
FIG. 3B is an enlarged partial plan view in the vicinity of an insertion opening 23a of the LCD module.

Next, descriptions will be provided for the mounting of the lamp unit to the LCD module 10. As shown in FIG. 3A, when mounting the lamp unit 1 from the right side of the LCD module 10, an end of the lamp holder 2, from which lamp cables 5 are not led out, is moved into the insertion opening 23a of the LCD module 10 along an arrow A shown in FIG. 3A. In the vicinity of the insertion opening 23a, as shown in FIG. 3B, a side of the light guide plate 16 is arranged such that the side portion thereof is exposed in a space surrounded by the pair of insertion openings 23a and 23b. The lamp holder 2 has a cross section in the shape of a letter U, and is pushed into the frame through the insertion opening 23a as shown in a perspective view of FIG. 4A, while being guided along the side portion of the light guide plate 16 in a direction of the longer side thereof, as shown in FIG. 4C. In this event, the lamp holder 2 is guided in spaces respectively between the front chassis 13 and the light guide plate 16 and between the back chassis 18 and the light guide plate 16. As described above, by inserting the lamp holder 2 in the state where the lamp holder 2 is guided along the side portion of the light guide plate 16, the lamp 3 of the lamp unit 1 and the light guide plate 16 are aligned with each other. When the lamp holder 2 is pushed in further, the lamp holder 2 is completely stored inside of the insertion opening 23a as shown in a perspective view of FIG. 4B. Thereby, the locking part 24a of the insertion opening 23a pushes an end surface of the lamp holder 2. As shown in FIG. 1A, the insertion opening 23b is formed on the left side of the LCD module 10, and the locking part 24b of substantially L-shape is disposed on the back chassis 18 in the vicinity of the entrance of the insertion opening 23b. When inserting the lamp holder 2 from the insertion opening 23a on the right side of the LCD module 10, the locking part 24b of L-shape, which is placed in the vicinity of the entrance of the insertion opening 23b on the left side of the LCD module 10, pushes back the other end surface of the lamp holder 2 so that the lamp holder 2 is prevented from being pushed out of, and from falling off, the left side of the LCD module 10. Such functions of the pair of locking parts 24a and 24b cause the lamp holder 2 of the lamp unit 1 to be fastened to, and to be held in, the LCD module 10.

Figure 4A:
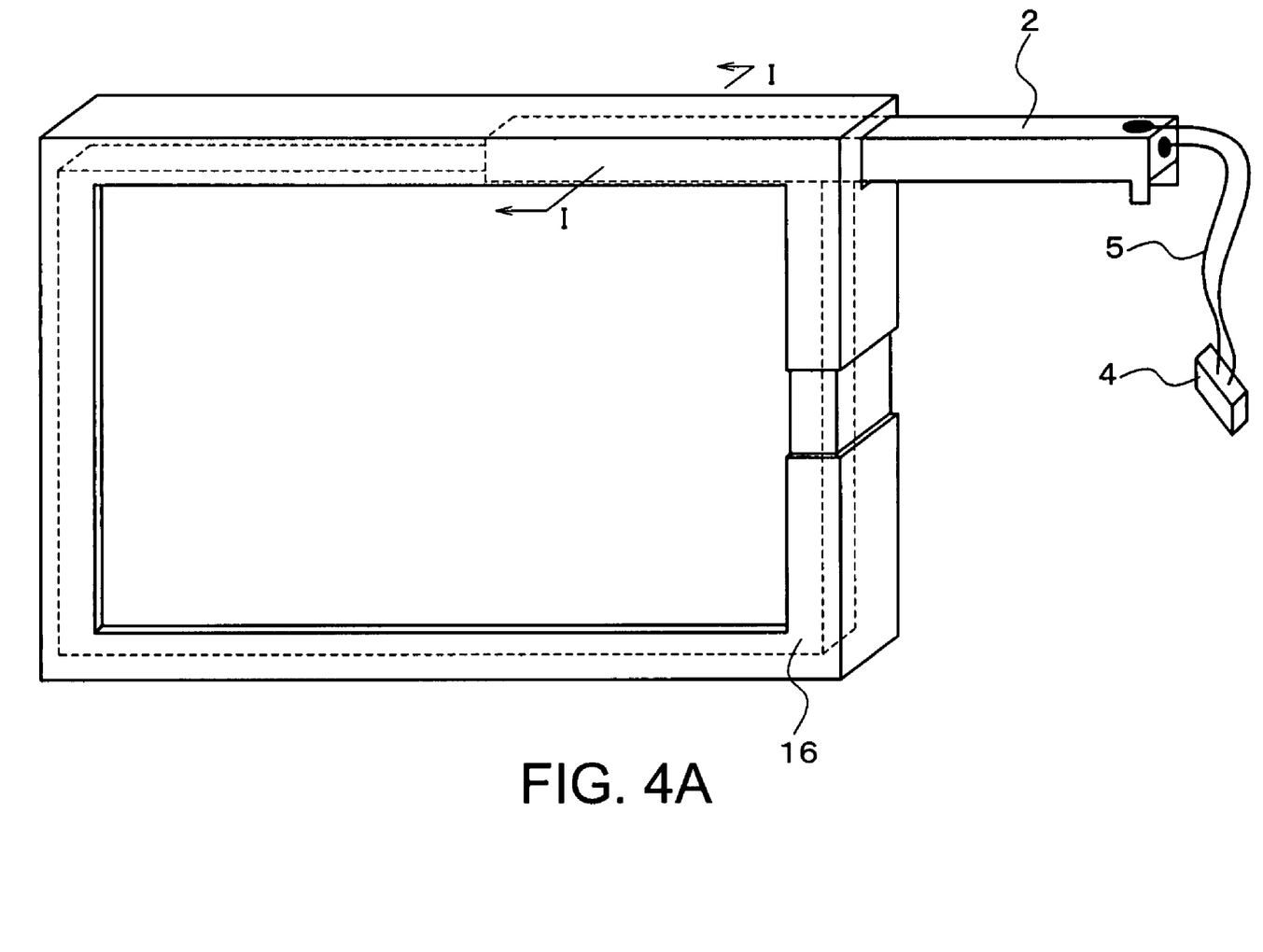
FIGS. 4A and 4B are respectively perspective views for describing the mounting of a lamp unit on the LCD module of the first exemplary embodiment.
Figure 4B:
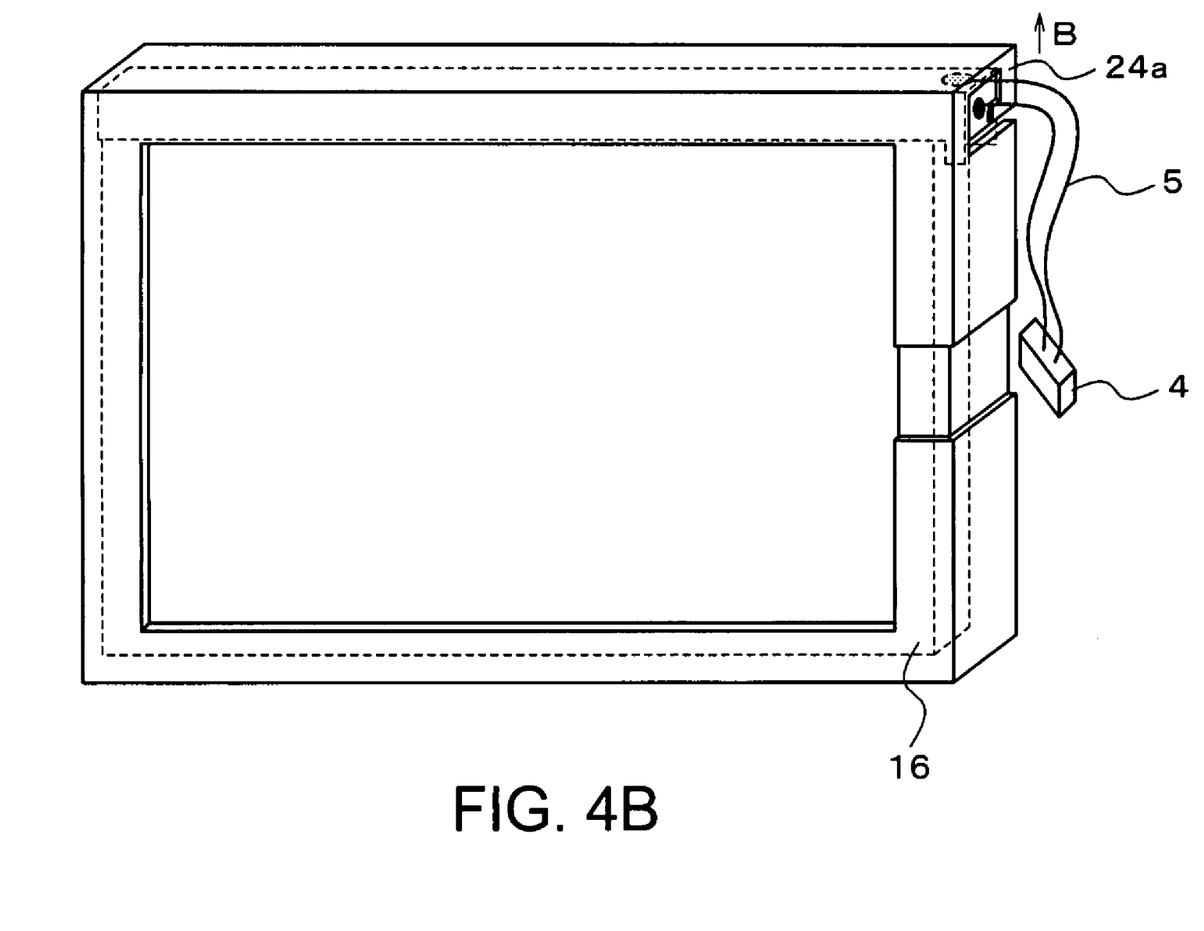
Figure 4C:
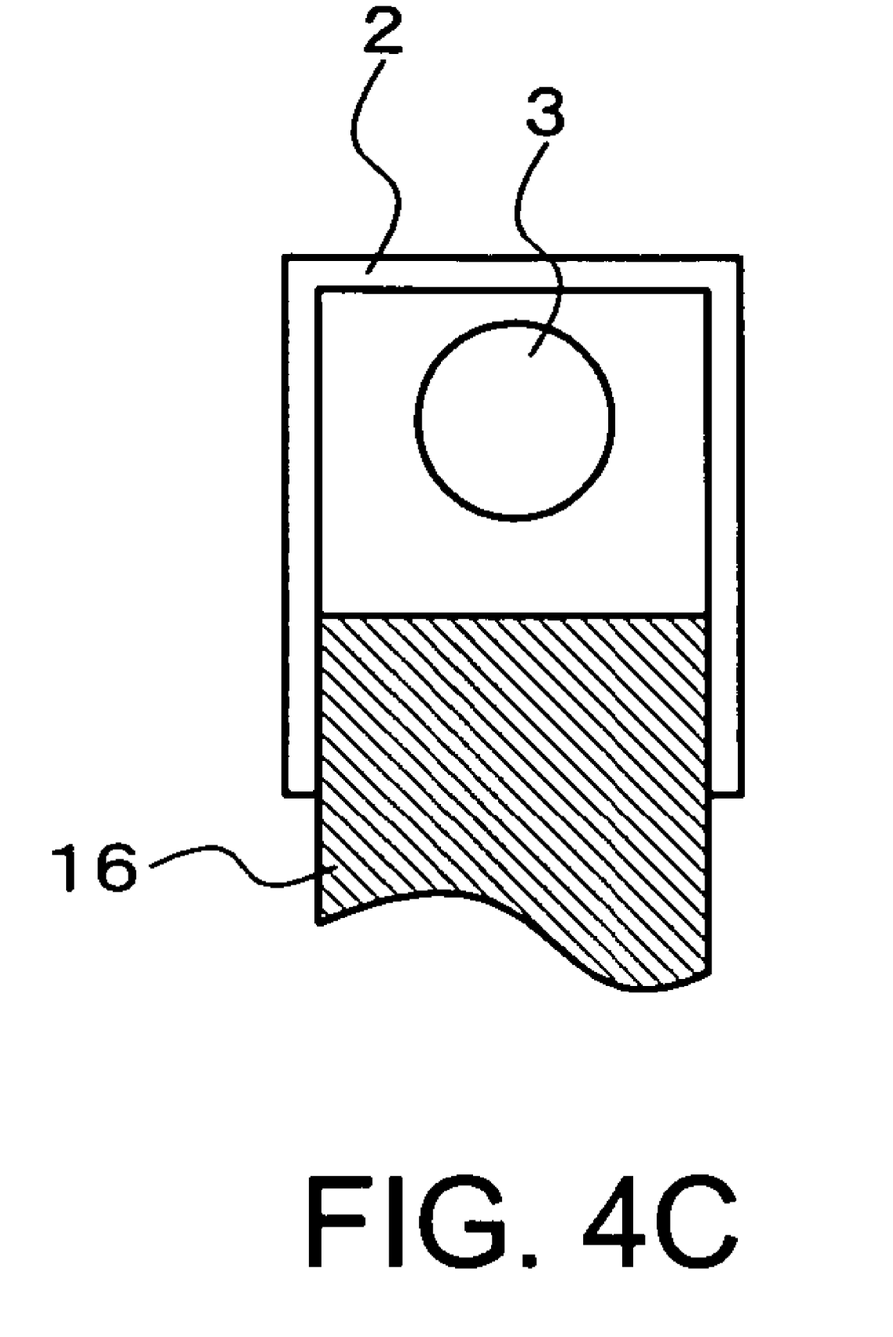
FIG. 4C is a sectional view of main parts, which is taken along the line I-I of FIG. 4A, for describing the aligning of a lamp holder 2a of the lamp unit and a light guide plate 16.

In a case where it is necessary to exchange the mounted lamp unit 1, in order to take the lamp unit 1 out of the LCD module 10, the locking part 24a of substantially L-shape in the vicinity of the entrance of an insertion opening, i.e. the insertion opening 23a, into which the lamp holder 2 is plugged, is displaced in the direction of an arrow B of FIG. 4B so that the lamp holder 2 is pulled out.

Next, descriptions will be provided for the mounting of the lamp unit 1 from the left side of the LCD module 10 for a case where the connection terminal on the set product is disposed on the left side of the LCD module 10. In this case, the lamp holder 2 is inserted through the insertion opening 23b. As shown in FIG. 5B, a side of the light guide plate 16 is arranged in the vicinity of the insertion opening 23b so that the side is exposed in a space surrounded by the pair of insertion openings 23a and 23b. The lamp holder 2 is pushed into the frame through the insertion opening 23b while being guided on the side of the light guide plate. The lamp holder 2 is guided in spaces respectively between the front chassis 13 and the light guide plate 16 and between the back chassis 18 and the light guide plate 16. As shown in a perspective view of FIG. 5A, when the lamp holder 2 is pushed in further, the lamp holder 2 is completely stored inside of the insertion opening 23b. When inserting the lamp holder 2 from the insertion opening 23b on the left side of the LCD module 10, the locking part 24a of substantially L-shape, which is placed in the vicinity of the entrance of the insertion opening 23a on the right side of the LCD module 10, pushes back the other end surface of the lamp holder 2 so that the lamp holder 2 is prevented from being pushed out of, and from falling off, the right side of the LCD module 10. Such functions of the pair of locking parts 24a and 24b cause the lamp holder 2 of the lamp unit 1 to be fastened to, and to be held in, the LCD module 10.

Figure 5A:
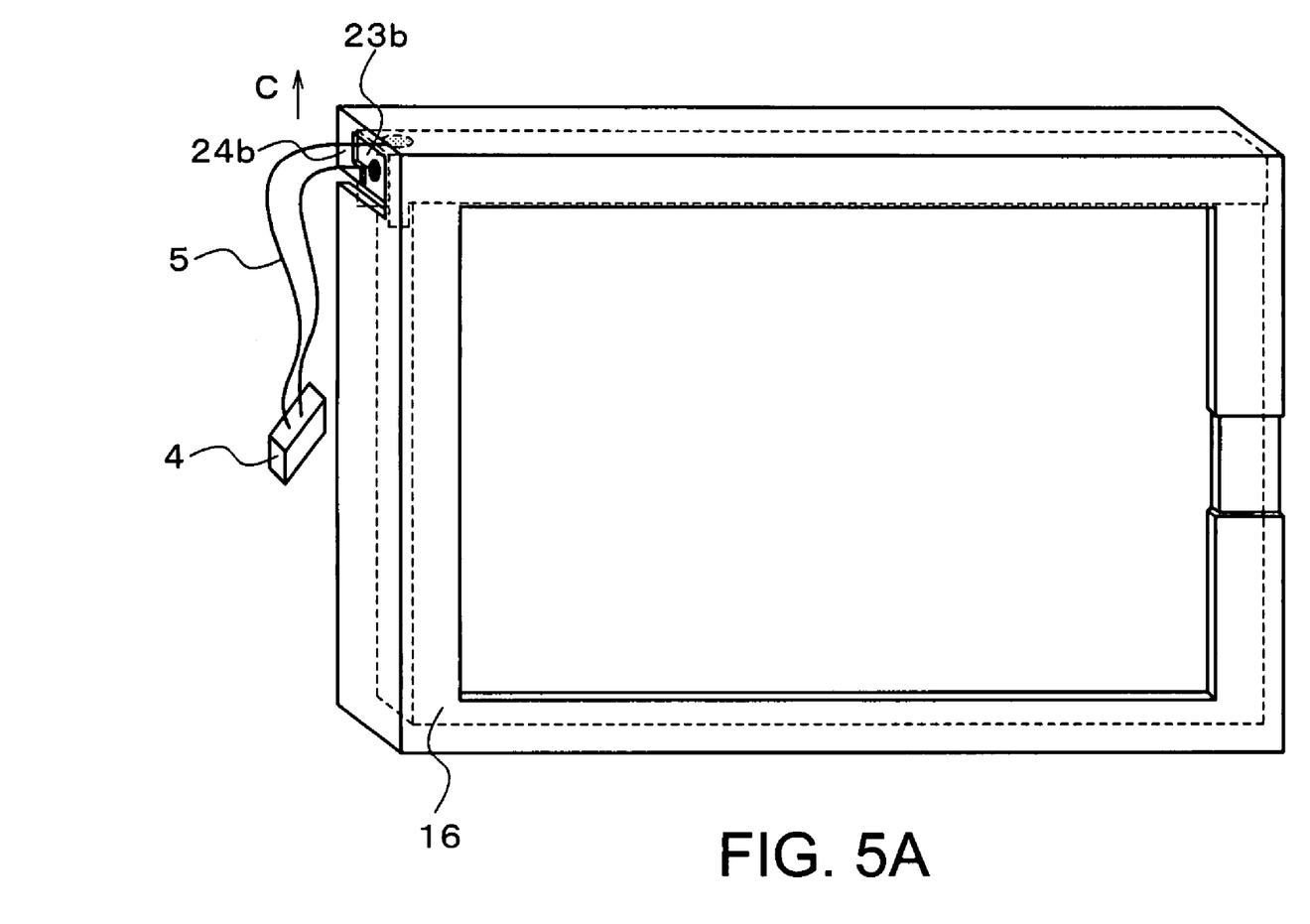
FIG. 5A is a perspective view showing another embodiment of the mounting of a lamp unit on the LCD module of the first exemplary embodiment.
Figure 5B:
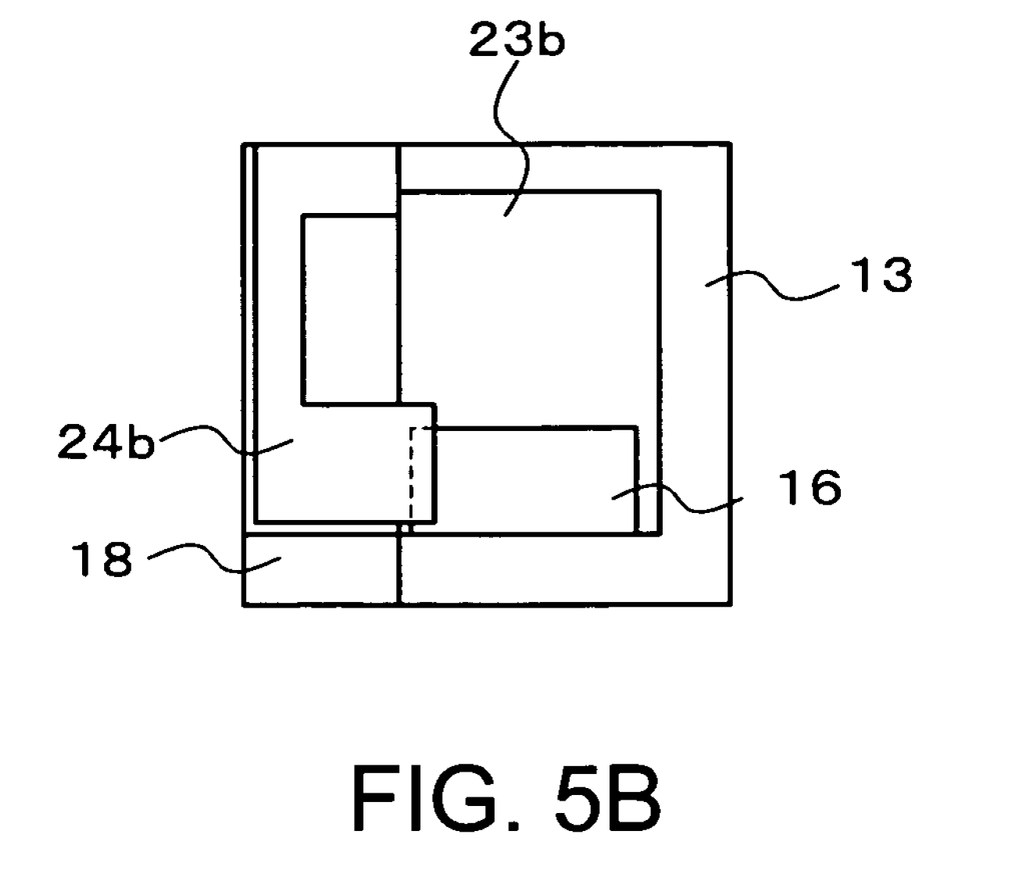
FIG. 5B is an enlarged partial plan view in the vicinity of an insertion opening 23b of the LCD module.

In a case where it is necessary to exchange the mounted lamp unit 1, in order to take the lamp unit 1 out of the LCD module 10, the locking part 24b of substantially L-shape in the vicinity of the entrance of an insertion opening, i.e. the insertion opening 23b, into which the lamp holder 2 is plugged, is displaced in the direction of an arrow C of FIG. 5A so that the lamp holder 2 is pulled out.

Use of the LCD module 10 of the present embodiment makes it possible to mount the lamp unit 1 on the LCD module 10 either from right or left of the LCD module 10 so that the position of the lamp unit 1 corresponds to the disposition of the connecting terminal on the set product. Accordingly, it is made possible to connect the lamp unit 1 to the connecting terminal of the set product, and to supply a drive voltage to the lamp of the lamp unit without the need of the following. Specifically, there is no need to extend the lamp cable and the like to connect thereof to a connecting terminal on the set product, or to rotate, instead of to extend, the LCD module by 180 degrees to connect the lamp cable to the connecting terminal on the set product. As a result, it is rarely necessary to have a new structural design for accommodating the disposition of the connecting terminal of the set product. Thereby, the LCD module 10, which has a large degree of freedom for being adapted to the set products, can be achieved.

Furthermore, the pair of locking parts 24a and 24b in the form of substantially L-shaped plate spring are provided to the back chassis 18 in the vicinities of the entrances respectively of the insertion openings 23a and 23b. Accordingly, the structure of the LCD module 10 can be modified easily by changing the structural design of the back chassis 18.

Second Embodiment

Subsequently, an LCD module of a second exemplary embodiment of the present invention is described with reference to the accompanying drawings. The front shield 11, the light condenser sheet 14, the diffuser sheet 15, the reflector sheet 17, the signal processing substrate 19, the back shield 20, the vertical driver ICs 21, the horizontal driver ICs 22, and the like, which are equivalent to those of the first exemplary embodiment, are used for an LCD module of the second exemplary embodiment.

An LCD module of the second exemplary embodiment includes a lamp unit 1 mounted therein mounted therein as an example of a light-source unit. The lamp unit 1 has the lamp holder 2, the connector 4 and the lamp cables 5. The lamp holder 2 has the cold-cathode fluorescent lamp as an example of a lamp, and reflects light from the lamp. The connector 4 is for external connection, and supplies a drive voltage to the lamp. The lamp cables 5 connect the lamp holder and the connector 4 with each other. The LCD module includes an LCD panel, a lighting unit, and a frame made of a front chassis 13 and a back chassis 18 to hold the LCD panel and the lighting unit therebetween in a state where the LCD panel and the lighting unit are superposed.

Moreover, as in the LCD module of the first exemplary embodiment, the LCD module of the second exemplary embodiment includes a pair of insertion openings 23a and 23b, the two openings being respectively on the two opposite side surfaces of the frame. Fastening means is formed in each of the vicinities of the pair of insertion openings 23a and 23b in order to hold the lamp holder 2 of the lamp unit 1 in the frame when the lamp holder 2 is inserted through either one of the insertion openings 23a and 23b.

Also in the present embodiment, the above-described lighting unit is a back light unit which receives light from the cold-cathode fluorescent lamp of the above lamp unit 1, and which illuminates the above LCD panel 12. The lighting unit includes the light guide plate 16 which receives light from the cold-cathode fluorescent lamp of the above lamp unit 1, and which illuminates the above LCD panel 12.

In the second exemplary embodiment, a locking part, which is the fastening means, is different from those of the first exemplary embodiment. Specifically, the fastening means includes a pair of concave and convex parts. One of the pair is provided to the frame in the vicinity of the insertion opening 23a, and the other part of the pair is provided to the lamp holder 2 of the lamp unit 1. The concave part and the convex part are fitted to each other in a state where the lamp holder 2 of the lamp unit 1 is inserted into the frame through the insertion opening 23a. In this event, a convex part 2a is provided to the lamp holder 2, and a concave part 18a is provided to the back chassis 18 of the frame. The concave part and the convex part may be constituted such that the two parts are fitted to each other in a state where the lamp holder 2 of the lamp unit 1 is inserted through either one of the insertion openings. For this reason, it can also be considered that the concave part is provided to the lamp holder 2, and the convex part is provided to the back chassis 18 of the frame.

Figure 6A:
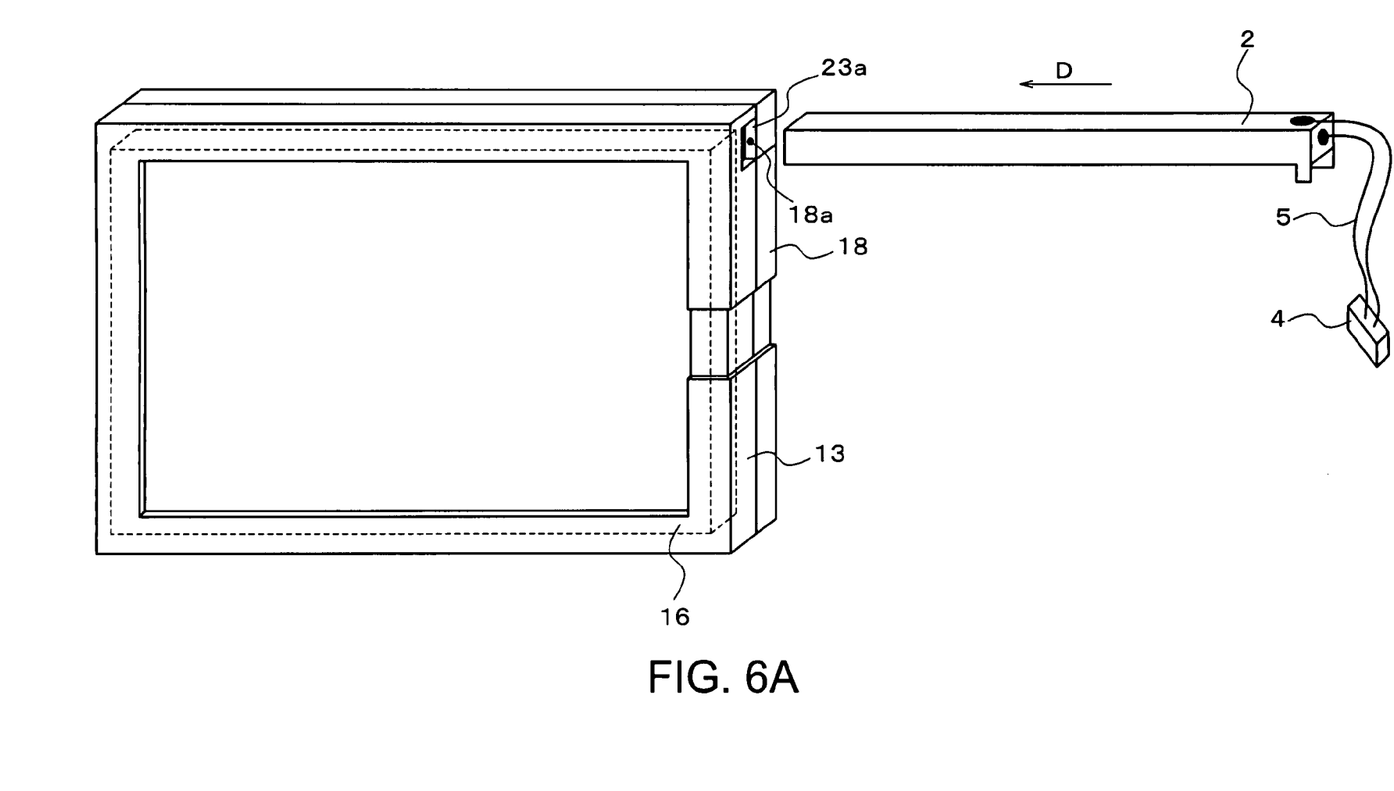
FIG. 6A is a perspective view for describing the mounting of a lamp unit on an LCD module of a second exemplary embodiment.

The insertion openings 23a and 23b, through which the lamp holder 2 of the lamp unit 1 are plugged in, are formed on the frame formed in a state where the front chassis 13 and the back chassis 18 are fastened to each other. As shown in FIG. 6A, the insertion opening 23a is provided to the right side of the frame, and the unillustrated insertion opening 23b is provided to the left side of the frame. Specifically, the insertion openings 23a and 23b are respectively disposed on the right and left sides of the frame. The convex part constituting the fastening means is disposed on the back chassis 18 of the frame in the vicinity of the insertion opening 23a, and the convex part is disposed on the lamp holder 2 of the lamp unit 1.

Figure 6B:
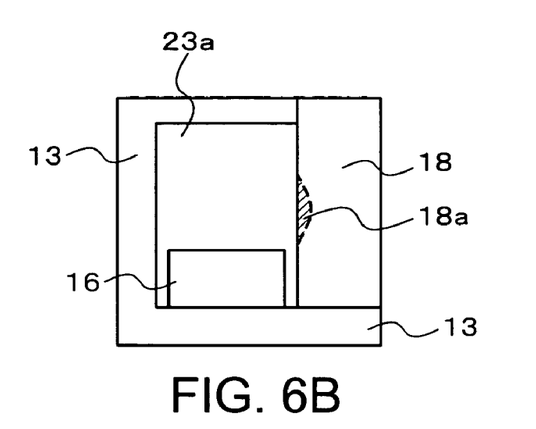
FIG. 6B is an enlarged partial plan view in the vicinity of an insertion opening 23a of the LCD module of the second exemplary embodiment.
Figure 6C:
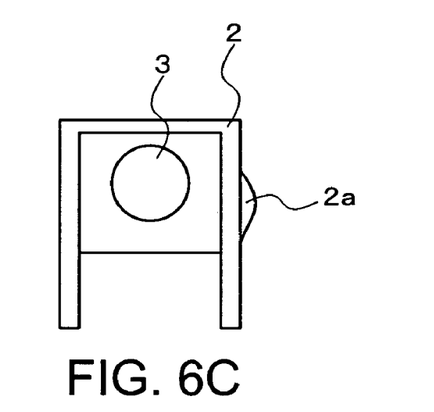
FIG. 6C is a side view of a lamp unit mounted on the LCD module of the second exemplary embodiment.
Figure 6D:
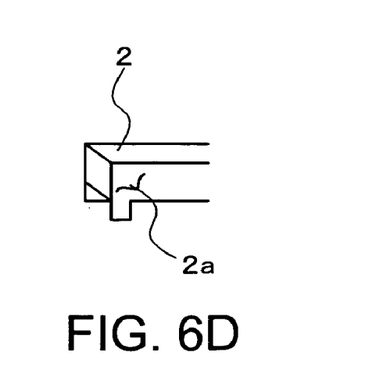
FIG. 6D is a perspective view showing an end of the lamp unit.

Next, descriptions will be provided for the mounting of the lamp unit to the LCD module as described above. As shown in FIG. 6A, when mounting the lamp unit from the right side of the LCD module, an end of the lamp holder 2, from which lamp cables 5 are not led out, is moved into the insertion opening 23a of the LCD module along an arrow D shown in FIG. 6A. As shown in an enlarged partial plan view of FIG. 6B, the vicinity of the insertion opening 23a has a structure in which an end of the light guide plate 16 is stuck out into a part of the insertion opening 23a. The lamp holder 2 has a cross section in the shape of a letter U, and is pushed into the frame through the insertion opening 23a while being guided along a side of the light guide plate 16. The lamp holder 2 is guided in spaces respectively between the front chassis 13 and the light guide plate 16 and between the back chassis 18 and the light guide plate 16. As described above, by inserting the lamp holder 2 in the state where the lamp holder 2 is guided along the side of the light guide plate 16, the lamp 3 of the lamp unit 1 and the light guide plate 16 are aligned with each other. When the lamp holder 2 is pushed in further, the lamp holder 2 is completely stored inside of the insertion opening 23a. At this time, the concave part, which is disposed on the back chassis 18 in the vicinity of the insertion opening 23b on the left side of the LCD module, and the convex part, which is disposed on a tip of the lamp holder 2 inserted through the insertion opening 23a, are fitted to each other. Furthermore, the concave part 18a, which is disposed on the back chassis 18 in the vicinity of the insertion opening 23a on the right side of the LCD module, and the convex part 2a, which is disposed on the side from which the lamp cables 5 of the lamp holder 2 are led out, are fitted to each other. Such mechanisms of the concave and convex parts cause the lamp holder 2 of the lamp unit 1 to be fastened to, and to be held in, the LCD module.

In a case where it is necessary to exchange the lamp unit 1 thus mounted, in order to take the lamp unit 1 out of the LCD module, the lamp holder 2 is pulled out through one of the insertion openings, i.e. the insertion opening 23a, into which the lamp holder 2 is plugged.

Next, descriptions will be provided for the mounting of the lamp unit 1 from the left side of the LCD module 10 for a case where a connection terminal on the set product is disposed on the left side of the LCD module 10. In this case, the lamp holder 2 is inserted through the insertion opening 23b. In the vicinity of the insertion opening 23b, an end of the light guide plate 16 is stuck out into a part of the insertion opening 23b. The lamp holder 2 is pushed into the frame through the insertion opening 23b while being guided on the side of the light guide plate 16. The lamp holder 2 is guided in spaces respectively between the front chassis 13 and the light guide plate 16 and between the back chassis 18 and the light guide plate 16. When the lamp holder 2 is pushed in further, the lamp holder 2 is completely stored inside of the insertion opening 23b. When inserting the lamp holder 2 through the insertion opening 23b on the left side of the LCD module, the concave part 18a, which is disposed on the back chassis 18 in the vicinity of the insertion opening 23a on the right side of the LCD module 10, and the convex part 2a, which is disposed on an end of the lamp holder 2 inserted through the insertion opening 23b, are fitted to each other. Furthermore, the concave part, which is disposed on the back chassis 18 in the vicinity of the insertion opening 23b on the left side of the LCD module 10, and the convex part, which is disposed on the side from which the lamp cables 5 of the lamp holder 2 are led out, are fitted to each other. Such mechanisms of the concave and convex parts cause the lamp holder 2 of the lamp unit 1 to be fastened to, and to be held in, the LCD module 10.

In a case where it is necessary to exchange the lamp unit 1 thus mounted, in order to take the lamp unit 1 out of the LCD module 10, the lamp holder 2 is pulled out through one of the insertion openings, i.e. the insertion opening 23b, into which the lamp holder 2 is plugged.

As in the case of the first exemplary embodiment, use of the LCD module of the second exemplary embodiment makes it possible to mount the lamp unit 1 on the LCD module either from right or left of the LCD module so that the position of the lamp unit 1 corresponds to the disposition of the connecting terminal on the set product. Accordingly, it is made possible to connect the lamp unit 1 to the connecting terminal of the set product, and to supply a drive voltage to the lamp of the lamp unit without the need of the following. Specifically, there is no need to extend the lamp cable and the like to connect thereof to a connecting terminal on the set product, or to rotate, instead of to extend, the LCD module by 180 degrees to connect the lamp cable to the connecting terminal on the set product. As a result, it is rarely necessary to have a new structural design for accommodating the disposition of the connecting terminal of the set product. Thereby, the LCD module, which has a large degree of freedom for being adapted to the set products, can be achieved.

Furthermore, a structure for fastening the lamp holder 2 is disposed inside the LCD module. Thus, the lamp holder 2 can be fastened without changing the appearance of the LCD module.

The preferred embodiments of the invention have been described above. However, the present invention is not limited to the above-described embodiments, and various changes and additions can be made. In the above embodiments, descriptions have been provided for the cases where the pair of insertion openings are provided in a way that the two openings are respectively on both of the left and right sides of the LCD module. However, it is also possible to configure the LCD module such that a pair of insertion openings are provided in a way that the two openings are respectively on the upper side and the lower side of the LCD module. Thereby, the lamp holder can be attached or detached through any of upper and lower insertion openings.

In the above-described embodiments, descriptions have been provided for the cases where one lamp unit is mounted on one LCD module. However, the present invention is applicable to an LCD module having a structure in which a plurality of lamp units, e.g., two lamp units, are disposed respectively on the upper and lower sides of a light guide plate or on right and left sides thereof.

Figure 7A:
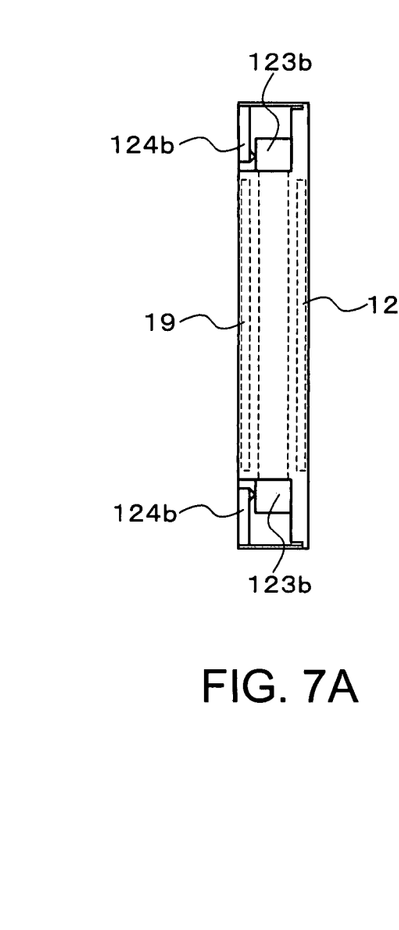
FIG. 7A is a left side view of an LCD module of a first modified example of the present invention.
Figures 7B, 7C:
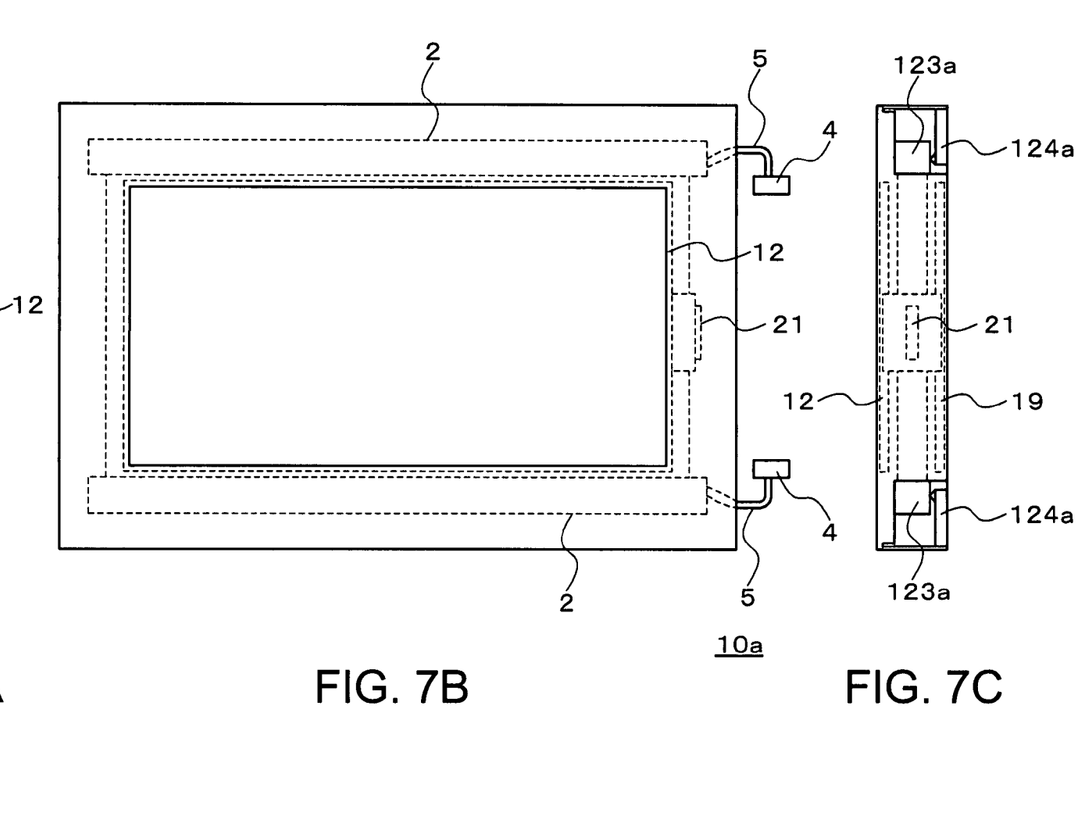
FIG. 7B is a front view of the LCD module.
FIG. 7C is a right side view of the LCD module.

FIGS. 7A to 7C each show an LCD module 10a, which is designed such that a plurality of lamp units are respectively disposed on the upper and lower sides of a light guide plate. As shown in FIGS. 7A and 7C, in the LCD module 10a, a pair of insertion openings 123a are both provided to the right side of a frame, and a pair of insertion openings 123b are both provided to the left side of the frame. Furthermore, fastening means is formed in each of the vicinities of the pairs of insertion openings 123a and 123b in order to hold a lamp holder 2 in the frame when the lamp holder 2 of the lamp unit is inserted through one of the insertion openings 123a and 123b. Specifically, locking parts 124a and 124b in the form of substantially L-shaped plate spring are respectively provided as the fastening means. The lamp holder 2 of the lamp unit is inserted through the insertion opening 123a or through the insertion opening 123b, and is pushed into the frame while being guided on a side of the light guide plate in the direction of the longer side thereof. In this way, the LCD module having the structure, in which the plurality of lamp units are respectively disposed on the upper and lower sides of the light guide plate, can be achieved.

Figure 8A:
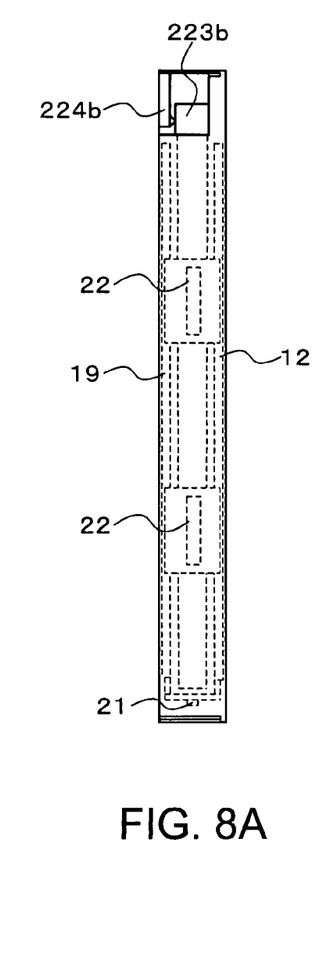
FIG. 8A is a left side view of an LCD module of a second modified example of the present invention.
Figure 8B:
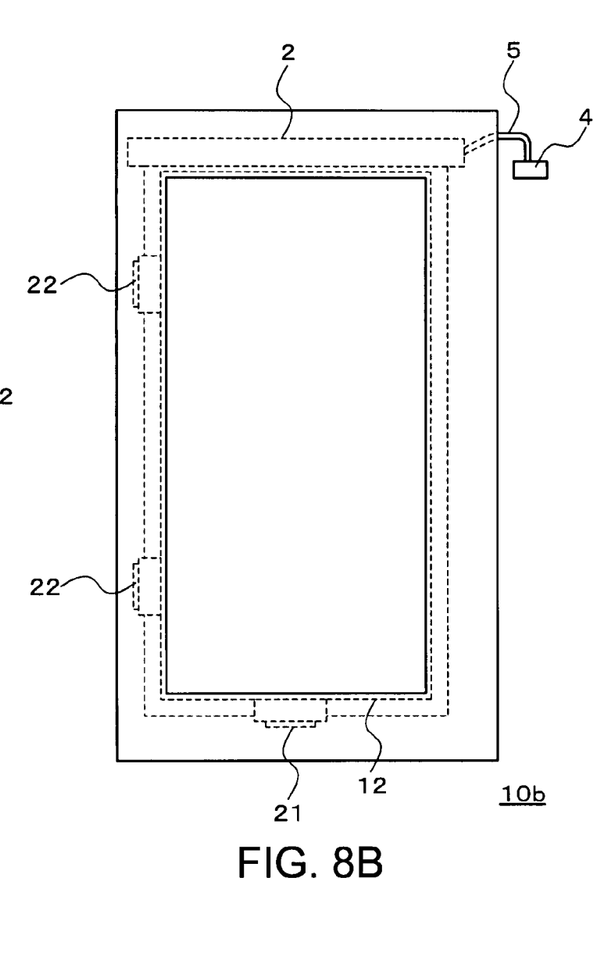
FIG. 8B is a front view of the LCD module.
Figure 8C:
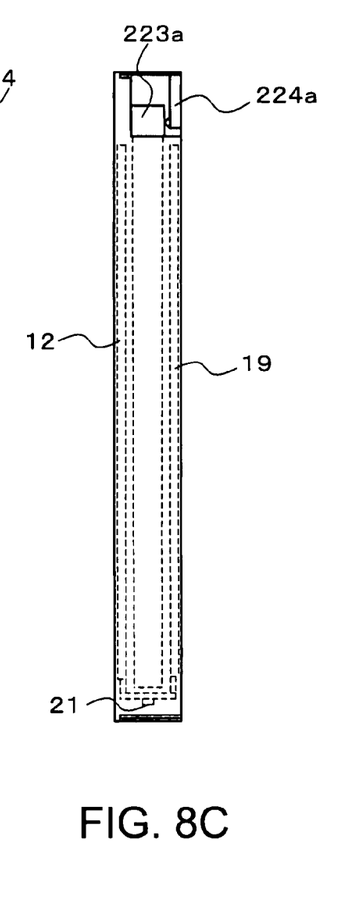
FIG. 8C is a right side view of the LCD module.

Moreover, in the above-described embodiments, descriptions have been provided for the cases where the lamp unit 1 is disposed along a direction of a longer side of the light guide plate. Meanwhile, the present invention is also applicable to a case where the lamp unit is disposed along a direction of a shorter side of the light guide plate. In FIGS. 8A to 8C, in an LCD module 10b, a lamp unit is disposed along the direction of the shorter side of the light guide plate. In FIGS. 8A and 8C, in the LCD module 10b, an insertion opening 223a is provided to the right side of a frame, and an insertion opening 223b is provided to the left side of the frame. Fastening means is formed in each of the vicinities of the insertion openings 223a and 223b in order to hold the lamp holder 2 in the frame when the lamp holder 2 of the lamp unit is inserted through the insertion opening 223a or through the insertion opening 223b. Specifically, locking parts 224a and 224b in the form of substantially L-shaped plate spring are respectively provided as the fastening means. The lamp holder 2 of the lamp unit is inserted through the insertion opening 223a or through the insertion opening 223b, and is pushed into the frame while being guided on a side of the light guide plate in the direction of the shorter side thereof. In this way, the LCD module having the structure, in which the lamp unit is disposed along the direction of the shorter side of the light guide plate, can be achieved.

In the above-described preferred embodiments, the LCD module having a back light unit as a lighting unit has been described. However, the present invention is also applicable to an LCD module, which includes a front light unit, and which illuminates the front side of an LCD panel with a light guide plate disposed on the front side of the LCD panel. In addition, even in a case where the LCD module once used is recovered, and is reused by incorporating thereof to a different set product, the lamp unit can be mounted on the LCD module either from right or left of the LCD module so that the position of the lamp unit corresponds to the disposition of the connecting terminal on the set product. For this reason, the LCD module of the present invention has a large degree of freedom for ways of mounting the lamp unit. Thus, the LCD module of the present invention is also appropriate for recycling, instead of discarding, resources for reuse.

The present invention enables one to incorporate an LCD module into a system without caring for the position of an inverter. Accordingly, the present invention can be utilized for reducing costs and development scheduling on the structural design of the system.

Although preferred embodiments of the invention has been described with respect to the drawings, it will be obvious to those skilled in the art that various changes or modifications may be made without departing from the true scope of the invention.

What is claimed is:

1. A liquid crystal display module comprising:
    a liquid crystal display panel;
    a lighting unit for illuminating the liquid crystal display panel, the lighting unit including a light-guiding member and a light-source unit;
    a housing member for accommodating the liquid crystal display panel and the lighting unit, the housing member being provided with a penetrated space for receiving the light-source unit therein; and
    a pair of fastening members attached to a pair of openings of the space, respectively, for supporting the light-source unit within the space such that each of the fastening members allows to insert the light-source unit into the space from either one of the pair of the openings.

2. The liquid crystal display module according to claim 1, wherein the light-source unit includes a light-source holding member for reflecting light from a light source towards the light-guiding member, and both ends of the light-source holding member are clamped by the fastening members.

3. The liquid crystal display module according to claim 2, wherein the light-guiding member is a light guide plate located behind the liquid crystal display panel such that the light-source holding member is arranged to be optically coupled to a side edge surface of the light guide plate.

4. The liquid crystal display module according to claim 3, wherein the pair of openings are arranged such that light-source holding member is allowed to be inserted through one of the openings while being guided along the side of the light guide plate.

5. The liquid crystal display module according to claim 1, wherein each of the fastening members is a plate spring provided in the vicinities of the pair of openings.

6. The liquid crystal display module according to claim 5, wherein the plate spring has an L-shaped plate such that an end portion thereof is allowed to displace its position to allow passing the light-source holding member through the pair of openings.

7. The liquid crystal display module according to claim 1, wherein each of the fastening members is made of a mechanical coupling structure using concave and convex portions provided inside of the space and outside of the light-source unit in the vicinities of the pair of openings.

8. The liquid crystal display module according to claim 5, wherein the pair of openings are disposed in a way that the two openings are respectively on the two opposite sides of the light-guiding member in a direction of a longer side thereof.

9. The liquid crystal display module according to claim 5, wherein a plurality of pairs of openings are disposed in a way that each of the pairs has the two openings respectively on two opposite sides of the light-guiding member.

10. The liquid crystal display module according to claim 5, wherein the pair of openings are disposed in a way that the two openings are respectively on the two opposite sides of the light-guiding member in a direction of a shorter side thereof.

11. The liquid crystal display module according to claim 1, wherein:
    the light-guiding member is a light guide plate;
    a side of the light guide plate is disposed such that the side thereof is exposed in a space surrounded by the pair of openings of the housing member; and
    a lamp holder of the light-source unit is inserted in the housing member through one of the openings while being guided along the side of the light guide plate.

12. The liquid crystal display module according to claim 11, wherein the pair of openings are disposed in a way that the two openings are respectively on the two opposite sides of the light guide plate in a direction of a longer side thereof.

13. The liquid crystal display module according to claim 11, wherein a plurality of pairs of openings are disposed in a way that each of the pairs has two openings respectively on the two opposite sides of the light guide plate.

14. The liquid crystal display module according to claim 11, wherein the pair of openings are disposed in a way that the two openings are respectively on the two opposite sides of the light guide plate in a direction of a shorter side thereof.

15. The liquid crystal display module according to claim 1, wherein the lighting unit is a back light unit which receives light from the light source, and which illuminates the liquid crystal display panel.

* * * * *